United States Patent [19]

Ito et al.

[11] Patent Number: 4,768,106

[45] Date of Patent: Aug. 30, 1988

[54] APPARATUS FOR RECORDING VIDEO AND PCM AUDIO SIGNALS WITH INSERT EDITING USING AXIALLY DISPLACED HEADS

[75] Inventors: Yuji Ito, Kanagawa; Hiroshi Okada, Tokyo, both of Japan

[73] Assignee: Sony Corporation, Tokyo, Japan

[21] Appl. No.: 44,840

[22] Filed: May 1, 1987

[30] Foreign Application Priority Data

May 23, 1986 [JP] Japan ............................... 61-118699

[51] Int. Cl.$^4$ .......................................... H04N 5/782
[52] U.S. Cl. ..................................... 360/14.1; 360/13; 360/19.1; 360/32; 360/64; 358/343
[58] Field of Search ................................ 358/310–311, 358/320, 323, 335, 337, 341, 343; 360/14.1, 14.2, 19.1, 33.1, 64, 70, 71, 84, 13, 32; 369/83; 371/40

[56] References Cited

U.S. PATENT DOCUMENTS

| | | | |
|---|---|---|---|
| 4,001,882 | 1/1977 | Fiori et al. | 360/14.1 |
| 4,409,682 | 10/1983 | Mori et al. | 369/83 X |
| 4,509,083 | 4/1985 | Nakano | 360/19.1 X |
| 4,533,963 | 8/1985 | Nakano et al. | 358/343 X |
| 4,536,805 | 8/1985 | Maeda | 360/14.1 |
| 4,551,771 | 11/1985 | Machida et al. | 360/19.1 |
| 4,558,378 | 12/1985 | Shibata et al. | 360/19.1 |
| 4,562,578 | 12/1985 | Odaka et al. | 371/40 |
| 4,602,298 | 7/1986 | Nishitani et al. | 360/14.1 |
| 4,651,239 | 3/1987 | Omori et al. | 360/19.1 X |
| 4,706,135 | 11/1987 | Kojima | 360/14.1 |

FOREIGN PATENT DOCUMENTS 0209151 1/1987 European Pat. Off. .

Primary Examiner—Raymond F. Cardillo
Assistant Examiner—W. R. Young
Attorney, Agent, or Firm—Alvin Sinderbrand

[57] ABSTRACT

An apparatus for recording video and digital audio signals in separate sections of slant tracks on a magnetic tape in the 8 mm format includes two main rotary magnetic heads for recording and reproducing both the video and digital audio signals during normal recording and reproduction modes and two auxiliary rotary magnetic heads for reproducing the digital audio signals during an audio edit mode. The auxiliary rotary heads are disposed for reproducing the digital audio signal recorded in respective tracks which are positioned upstream, considered in respect to the transporting direction of the tape, relative to the tracks to be next scanned by the main rotary heads so that the digital audio signals reproduced by the auxiliary rotary heads may be mixed with new audio signals and rerecorded by the main rotary heads in the same tracks from which they were produced. Consequently, the editing operation may replace all or only a small portion of the digital audio data in each track without disturbing the correspondence between the audio data and corresponding fields of video data.

13 Claims, 6 Drawing Sheets

APPARATUS FOR RECORDING VIDEO AND PCM AUDIO SIGNALS WITH INSERT EDITING USING AXIALLY DISPLACED HEADS

FIELD OF THE INVENTION

This invention relates to an apparatus for recording video and audio signals in separate areas of slant tracks and more particularly is directed to an 8 mm video tape recorder in which video signals and digital audio signals are recorded in separate sections of the slant tracks formed on a magnetic tape by rotary magnetic heads.

BACKGROUND OF THE INVENTION

Video tape recorders having two rotary magnetic heads separated by 180° which record a video signal in alternate successive slant tracks on a magnetic tape are well known in the art. Recently, these video tape recorders (VTRs) have been provided in an 8 mm format in which the rotary heads record both the video signal and an accompanying digital audio pulse code modulated (PCM) signal in separate record sections of each of the successive slant tracks. One such VTR is disclosed in U.S. Pat. No. 4,551,771, issued Nov. 5, 1985 and assigned in common with the present application. As disclosed therein, the tape is wrapped around a rotary drum mounting the rotary heads in an arc greater than 180°, so that each track scanned by a head includes an overscan section subtending a small angle and then a main section subtending 180°. During recording, the audio signal associated with each field of the video signal is converted into a block of digital audio PCM words, error encoded and time base compressed so that it may be recorded within the overscan section of one track. The time required for the conversion, encoding and time base compression generally corresponds to one field interval of the accompanying video signal, so that the block of audio PCM data is available for recording only after the corresponding field of the video signal has been recorded, and is therefore recorded in the overscan section of a following track. The audio PCM signal is supplied to the rotary heads while they trace the overscan sections and the video signal is supplied to the rotary heads while they trace the main sections so that the audio and video signal are recorded in the overscan and main sections, respectively.

During reproduction, the slant tracks are alternately traced by the two rotary heads to produce output signals. The digital audio PCM signals are time base expanded, decoded and converted into analog form, a process which also requires a time corresponding to one field interval of the video signal. Consequently, a total delay between the audio signal and the corresponding video signal created by recording and subsequent reproduction amounts to two field intervals.

One highly advantageous method of error correction encoding which may be applied to the audio PCM data recorded by an 8 mm VTR is the cross interleaving method disclosed in U.S. Pat. No. 4,562,578, issued Dec. 31, 1985 and assigned in common with the present application, in which index words are annexed to blocks of digital audio words obtained by digitizing fields of stereo audio signals, and the combined words are then scrambled, parity and error correction codes are added thereto and the resulting data is converted into serial data for transmission. This method provides the ability to correct errors in the recorded digital audio signals to a very high degree of accuracy.

However, the cross interleaving method requires that the index words, error correction words etc. be thoroughly intermixed with the audio data words, with the result that it is impossible to edit or dub a limited area within each block recorded in each overscan section while leaving the remaining areas unchanged. In fact, in order to edit any of the audio signal, it is necessary to reproduce the entire block, mix or dub the audio data, recompute the error correction codes and rerecord the entire new block. Since the time base compression and expansion, conversion and error correction processing require a total delay of two field intervals, that is, one field interval during reproduction and one field interval during recording, each dubbing operation will cause each block of audio signal to drop two more field intervals, i.e. two more tracks, behind its corresponding field of video signal. As a result, the timing control required for presenting the audio signal simultaneously with the video signal becomes extremely complicated.

OBJECTS AND SUMMARY OF THE INVENTION

It is therefore an object of the present invention to provide an apparatus for recording video and audio signals which removes the above-described difficulties of the prior art.

It is a further object of the present invention to provide apparatus for recording video and audio signals in which a dubbing operation may be performed while maintaining an unchanged correspondence between the recorded video and audio PCM signals.

It is yet a further object of the present invention to provide an apparatus for recording video and audio signals in which a limited portion of the block of digital audio data recorded in each overscan section may be edited or dubbed in a simplified operation.

In accordance with an aspect of the present invention, apparatus for recording video and audio signals in a plurality of successive tracks on a recording medium comprises first audio signal processing means receiving an original audio signal for converting the same to an original encoded digital audio signal, video signal processing means for providing a video signal, means for transporting the record medium in a transporting direction, at least first and second main rotary heads for recording signals supplied thereto in respective ones of the successive tracks on the recording medium, first switch means for selectively supplying the video signal and a recordable digital audio signal to the main rotary heads, control means for controlling the first switch means so that the video signal is supplied to the main rotary heads for recording in a main section of each of the tracks and the recordable digital audio signal is supplied to the main rotary heads for recording in an overscan section of each of the tracks, at least first and second auxiliary rotary heads disposed for reproducing the digital audio signal recorded in respective tracks which are positioned upstream, considered in respect to the transporting direction, relative to tracks to be next scanned by the first and second main rotary heads, respectively, second audio signal processing means for at least converting the signals reproduced by the auxiliary rotary heads to a decoded reproduced audio signal, audio signal inserting means having inputs for receiving a new decoded audio signal and the decoded reproduced audio signal and selectively combining the same to provide a decoded composite audio signal, third audio signal processing means for encoding the composite audio signal to a new encoded digital audio signal, and second switch means operable by the control means for supplying a selected one of the new encoded digital audio signal and the original encoded digital audio signal to the first switch means for supplying by the latter as the recordable digital audio signal to the main rotary heads.

The above, and other objects, features and advantages of the present invention will become readily apparent from the following detailed description of illustrative embodiments of the present invention which is to be read in connection with the accompanying drawings, throughout which like reference numerals denote like elements and parts.

DETAILED DESCRIPTION OF THE PREFERRED EMBODIMENTS

Figure 1:
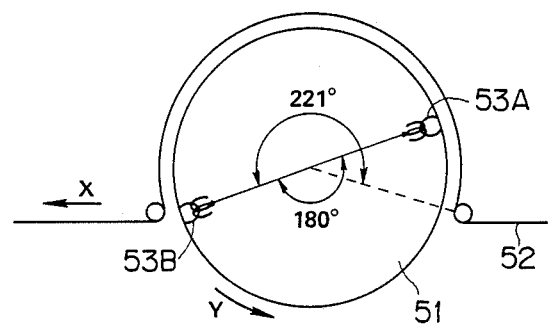
FIG. 1 is a schematic view of a rotary magnetic head unit in a conventional 8 mm VTR.
Figure 2:
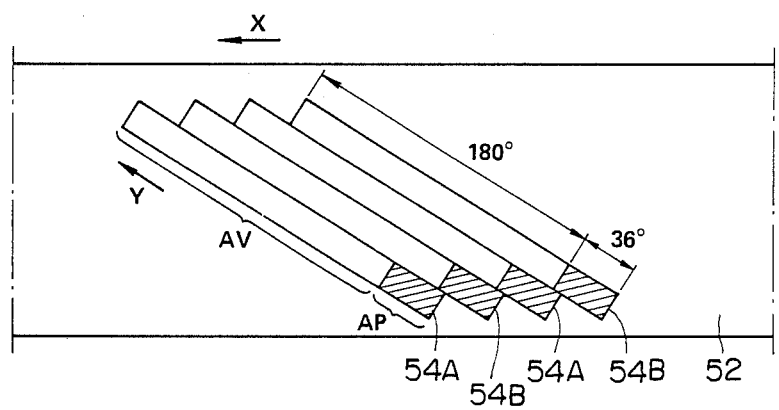
FIG. 2 is a schematic diagram showing a pattern of slant tracks in which signals are recorded on a magnetic tape by the VTR having the rotary head unit of FIG. 1.

Referring now to the drawings and initially to FIG. 1 thereof, it will be seen that the rotary magnetic head unit of a conventional 8 mm VTR, such as disclosed in the above-cited U.S. Pat. No. 4,551,771, includes a rotary drum 51 having a magnetic tape 52 wrapped around the peripheral surface thereof to subtend an angle of 221°. First and second rotary magnetic heads 53A and 53B having different azimuth angles are mounted on drum 51 with an angular interval of 180° therebetween, that is, at diametrically opposed positions. Tape 52 is transported at a selected constant speed in the direction of arrow X, while rotary magnetic heads 53A, 53B are rotated at a constant speed in the direction of arrow Y at a frame frequency of 30 Hz, or 30 rotations per second. Because tape 52 is wrapped at an angle relative to rotary drum 51, rotary heads 53A, 53B trace across tape 52 at a slant angle to produce a pattern of successive slant tracks as represented in FIG. 2. In FIG. 2, arrow X denotes the tape transporting direction as in FIG. 1, while arrow Y indicates the direction of travel of rotary heads 53A, 54B as they successively trace along the slant tracks on tape 52. As is conventional in such two head VTRs, rotary head 53A successively traces alternate tracks 54A, while rotary head 53B traces the remaining tracks 54B.

In the two head 8 mm VTR, the audio signal accompanying each field of video signal is converted into a pulse code modulated (PCM) digital signal, error correction encoded and time base compressed so as to be recordable by rotary heads 53A, 53B in respective slant tracks in overscan portions AP thereof. Corresponding fields of the video signal are recorded by the same rotary heads 53A, 53B in main sections AV of the respective tracks. Each overscan section AP corresponds to an angular distance of about 36° as traced by the respective rotary head 53A, 53B, while each main section AV corresponds to an angle of 180°. The total of these sections, corresponding to 216°, is made slightly less than the tape wrap angle of 221° to ensure that rotary heads 53A, 53B properly contact the tape during the overscan and main sections. In order to achieve this recording pattern, the audio PCM signal is supplied to rotary heads 53A, 53B during the time period when they are respectively tracing each overscan section AP, while the video signal is supplied to rotary heads 53A, 53B when they are respectively tracing each main section AV.

In addition to the audio PCM and video signals, a plurality of pilot signals to be used as tracking control signals or automatic track finding (ATF) signals are mixed with the audio PCM and video signals to be recorded in tracks 54A, 54B. These pilot ATF signals have frequencies different from those used for recording the audio and video signals and are switched cyclically from track to track. Thereafter, during reproduction, as the slant tracks 54A, 54B are alternately traced by rotary heads 53A, 53B to produce playback output signals, tracking control is performed on the basis of the pilot ATF signals extracted from the output signals by appropriate filters.

However, there are two difficulties associated with this conventional 8 mm VTR. The first is that usually the PCM audio signals are scrambled, error encoded and cross interleaved prior to recording so as to permit error correction after reproduction. As disclosed in the above-cited U.S. Pat. No. 4,562,578, one such encoding system annexes index words ID to a block of digital audio data words including 1050 words of left and right stereo audio data corresponding to each field of video data. The audio data and index words ID are first scrambled, then parity data words Q and P and cyclically redundant error correction codes CRC are added thereto. The resulting data block is then converted into serial form for transmission. Since the error correction codes applicable to the data words are scattered throughout the entire block, it is impossible to reproduce only a portion of the data of each block and have all the appropriate error correction words for that portion of the data. Consequently, the entire block must be reproduced in order to perform any editing or dubbing operation so that the data words in any limited area of the block will receive the corresponding error correction words.

Figure 3:
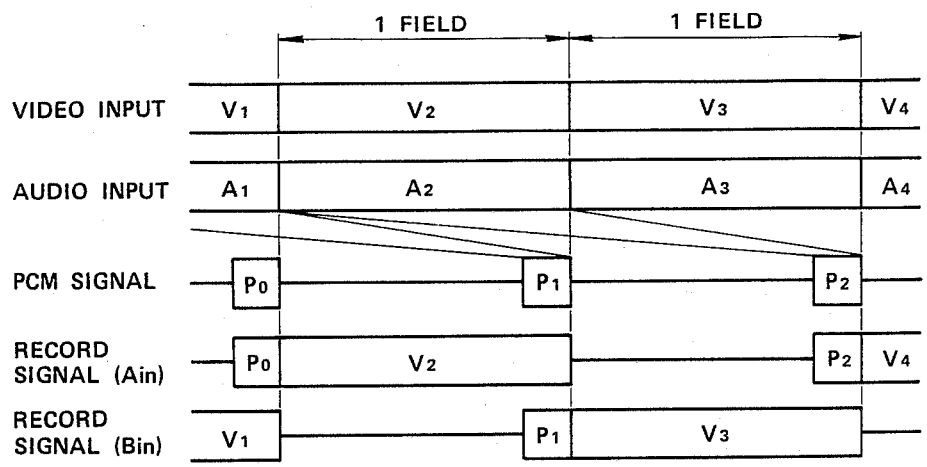
FIG. 3 is a timing chart illustrating the operation of the VTR having the rotary head unit of FIG. 1 in a recording mode.

The second problem is one of coordinating each field of the video signal with the corresponding block of audio PCM data. As shown in FIG. 3, the fields of the video input $V_1$–$V_4$ are initially aligned field by field with corresponding "fields" $A_1$–$A_4$ of audio input. However, during the process of digitizing the fields $A_1$ and $A_2$ of the audio input, for example, and encoding and time compressing them to form the audio PCM blocks $P_1$ and $P_2$ respectively, one field interval is usually required, so that the PCM block $P_1$ corresponding to audio input $A_1$ is not available until the end of the next following video field $V_2$. Consequently, when the video and audio signals are combined and then allocated into separate record signals Ain and Bin to be supplied to rotary heads 53A and 53B respectively, PCM block $P_1$ is available only during field $V_2$ of the video input, and practically is available only in time to be inserted just prior to field $V_3$ of the video input. Correspondingly, PCM block $P_2$ corresponding to audio input $A_2$ is only available for insertion just before field $V_4$ of the video input. Consequently, the recording process requires at least a one field interval delay between the fields of video input $V_1$–$V_4$ and the corresponding fields of audio inputs $A_1$–$A_4$.

Figure 4:
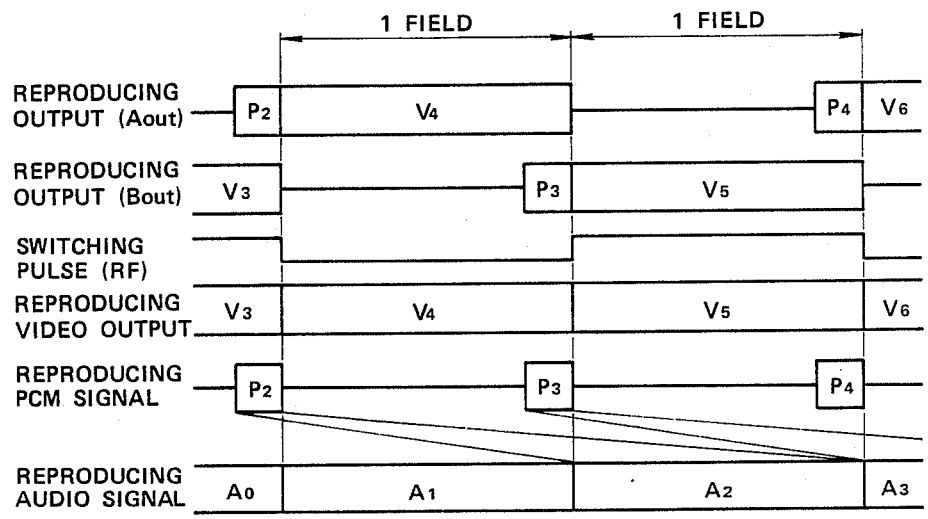
FIG. 4 is a timing chart illustrating the operation in the VTR having the rotary head unit of FIG. 1 in a playback mode.

The reproducing process produces a further one field interval delay. In the reproducing output Aout produced by rotary head 53A, as shown in FIG. 4, the PCM block $P_2$ reproduced during the overscan period just prior to video field $V_4$ requires a field interval for time base expansion, decoding and digital to analog conversion to form the audio field $A_2$. Therefore, audio field $A_2$, which originally was aligned with video field $V_2$, is now aligned with video field $V_5$, and the successive audio fields are similarly displaced relative to their video fields. Consequently, when the resultant image is displayed, the video fields must be stored and produced at a later time to correspond with the proper audio fields. This requires storage and timing control within the VTR to compensate for the relative displacement between the fields of video and audio information. However, when an editing operation on the audio data, for example block $P_1$ in FIG. 3, is to be performed by mixing the already recorded audio signal with a new audio signal, the previously recorded signal must be reproduced prior to dubbing, and so the dubbing operation itself requires another two field delay during which block $P_1$ is reproduced, expanded, decoded and converted to analog form, mixed with the new signal, converted back to digital form, compressed, encoded and then recorded. Therefore, the dubbed areas will have a different displacement between the respective video and audio fields.

Figure 5:
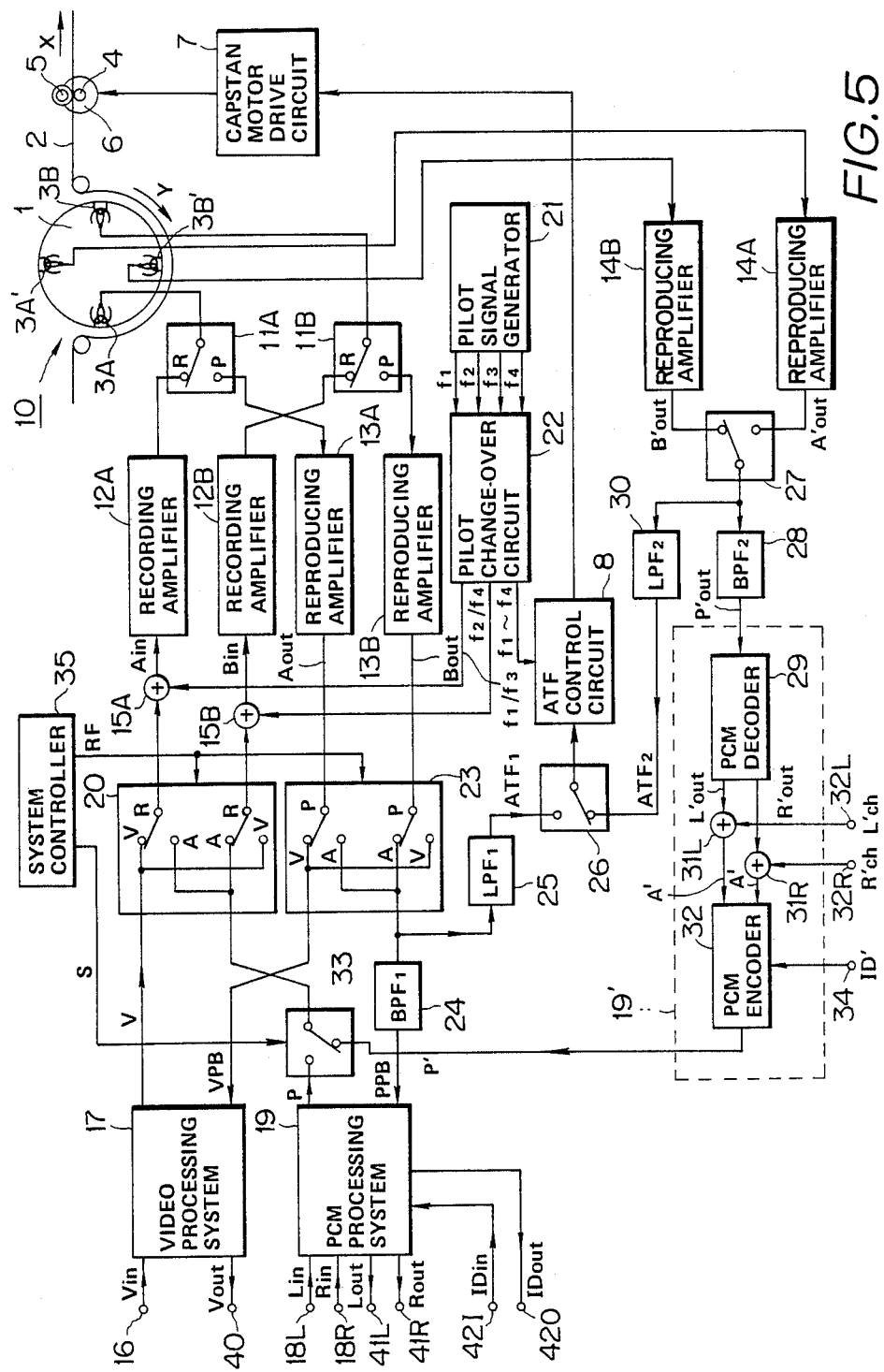
FIG. 5 is a block diagram of a preferred embodiment of the present invention advantageously applied to an 8 mm VTR.

The apparatus according to the present invention removes these difficulties and provides a simplified system for editing or dubbing an entire block of audio PCM data or only a portion thereof without disturbing the correspondence between the respective video and audio fields. Referring now to FIG. 5, a first embodiment of an 8 mm VTR to which the present invention is advantageously applied includes a rotary magnetic head unit 10 having a rotary drum 1 about which a magnetic tape 2 is wrapped over an angular extent of 221° and first and second main rotary magnetic heads 3A and 3B mounted at an angular separation at 180°, that is, at diametrically opposed positions and having different azimuth angles, as in the conventional rotary magnetic head unit illustrated in FIG. 1. Tape 2 is held between a capstan 4 and a pinch roller 5. Capstan 4 is driven by a capstan motor 6 to cause tape 2 to be transported at a selected constant speed in a transporting direction of tape 2 indicated by arrow X. The drive current for capstan motor 6 is supplied by a capstan motor drive circuit 7 subject to a capstan servo control such that, during a recording mode of operation, capstan motor 6 is driven at a constant speed, while during a reproducing mode of operation the instantaneous rotational speed of capstan motor 6, corresponding to the instantaneous running speed of tape 2, is varied in a known manner in accordance with ATF error signals supplied from an ATF control circuit 8 responsive to pilot ATF signals recorded on tape 2, as will be discussed below.

Figure 6:
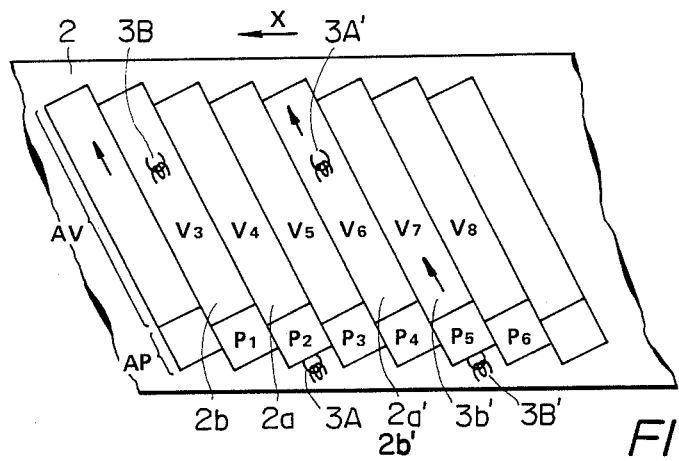
FIG. 6 is a schematic diagram showing a pattern of slant tracks in which signals are recorded on a magnetic tape by the VTR of FIG. 5 together with an indicated disposition of the rotary magnetic heads during a recording operation thereof.

In rotary head unit 10 illustrated in FIG. 5, as opposed to the conventional rotary head unit illustrated in FIG. 1, first and second auxiliary rotary heads 3A′ and 3B′ are further provided with an angular separation of 180° therebetween. Auxiliary rotary heads 3A′, 3B′ are not in the same plane as main rotary heads 3A, 3B, but rather are axially separated from main rotary heads 3A, 3B in a direction perpendicular to the plane of FIG. 5 so as to be disposed for reproducing the audio PCM signal recorded in respective tracks which are positioned upstream, considered in respect to the transporting direction of tape 2 indicated by arrow X, relative to the tracks to be scanned by main rotary heads 3A, 3B. Referring to FIG. 6, as tape 2 is transported in the transporting direction indicated by arrow X, upstream and downstream directions are defined relative thereto such that video field $V_3$ is recorded in a track 2b which is two tracks downstream from track 2b′ in which video field $V_5$ is recorded. Correspondingly, track 2b′ is two tracks upstream from track 2b. Each rotary head 3A, 3B, 3A′, 3B′ is driven in rotation in the direction of arrow Y (FIG. 5) at the frame frequency of 30 Hz by a drum motor, not illustrated, to trace along the respective tracks. In particular, if rotary head 3B traces along track 2b at one particular time, it will thereafter trace along track 2b′ two field intervals later after the tape 2 has been moved two tracks to the left in FIG. 6 in the direction of arrow X. Correspondingly, track 2a′ is two tracks upstream from track 2a, so that if main rotary head 3A traces track 2a at a particular time, it will trace track 2a′ at a time two fields intervals later.

Referring back to FIG. 5, the VTR to which the present invention is applied is shown to further include a video processing system 17 which receives an input conventional video signal Vin supplied at a video input terminal 16. A processed video signal V, which has been processed so as to be recordable, is supplied from video processing system 17 to each of two terminals V in head change-over switch 20. A PCM processing system 19 receives left and right channel audio signals Lin, Rin, advantageously in analog form, at input terminals 18L and 18R, respectively, and produces output blocks of a pulse code modulated, time compressed original encoded digital audio signal P, each block corresponding to one field of the input audio signals Lin, Rin. Digital audio signal P is supplied to a first input terminal of a switch 33, an output terminal of which is connected to each of two audio terminals A of head change-over switch 20. Switches 33 and 20, as well as additional switches and elements described below are controlled in their timing and operation by a system controller 35. In particular, system controller 35 supplies a control signal S to switch 33 to cause the output terminal thereof to be connected to the first input terminal to receive the original encoded digital audio signal P in the normal recording mode of the apparatus. As discussed below, in an editing or dubbing mode, system controller 35 produces control signal S to cause switch 33 to assume the condition shown on FIG. 5 in which the output terminal of switch 33 receives a new digital encoded audio signal P'.

System controller 35 controls the change-over of the moveable contacts of head change-over switch 20 between the two connected video input terminals V and the two connected audio input terminals A to occur at each half revolution of the main rotary heads 3A, 3B. In other words, when each track is to have one field of the video signal recorded therein, switch 20 is switched at each one field period by a frame-period switching pulse RF (FIG. 7) which reverses in polarity at each field period, that is, at each half revolution of rotary head arrangement 10. During the overscan period of each track, both adders 15A and 15B receive a signal, one adder receiving a video signal V for one track and the other receiving the digital audio signal P for the next track, while during the scanning of the main section of each track only one of the adders 15A and 15B receives a signal. Thus, when PCM processing system 19 produces digital audio signal P containing a block of audio data to be recorded in the overscan section of a track by main rotary head 3A, the moveable contact of switch 20 connected to adder 15A is changed-over to contact its respective audio input terminal A, while the moveable contact of switch 20 connected to adder 15B is changed-over to contact its respective video input terminal V. At the completion of this block of audio data the moveable contacts of switch 20 are changed-over or returned to the positions shown on FIG. 5 so that the corresponding field of video data contained in signal V from video processing system 17 is now supplied through adder 15A. Similarly, prior to the next video field, adder 15B will receive the corresponding block of audio data for the next track through the respective terminal A of switch 20, and, thereafter, switch 20 is changed-over so that adder 15B receives the corresponding field of video data through the respective terminal V of switch 20.

Adders 15A and 15B also respectively receive selected ones of four pilot ATF signals having frequencies $f_1, f_2, f_3, f_4$ produced by a pilot signal generator 21. These four pilot ATF signals from pilot signal generator 21 are supplied to a pilot change-over circuit 22 which selectively supplies the pilot ATF signals to adders 15A and 15B for superpositioning on successive fields of the video and digital audio signals supplied to adders 15A and 15B which thereby output a recording signal Ain and a recording signal Bin, respectively. The four pilot ATF signals are also supplied to an ATF control circuit 8 which is operative during reproduction to supply tracking servo control signals to capstan motor drive circuit 7.

Recording signals Ain and Bin from adders 15A and 15B are the signals to be recorded by main rotary heads 3A, 3B, respectively, and are supplied thereto through respective recording amplifiers 12A and 12B connected to record terminals R of record/playback switches 11A and 11B, respectively. The output terminal of switch 11A is connected to main rotary head 3A and, in the recording mode, switch 11A is controlled by system controller 35 so that its movable contact contacts the record terminal R and recording signal Ain is supplied to main rotary head 3A for recording in its respective tracks. Correspondingly, the movable contact of switch 11B is connected to main rotary head 3B and, in the recording mode, switch 11B is controlled by system controller 35 so that its movable contact engages the respective record terminal R and recording signal Bin is supplied to main rotary head 3B for recording in its respective tracks.

PCM processing system 19 further includes an input terminal 42I for receiving input index signals IDin and an output terminal 42O for outputting index signals IDout. Index signals ID include data words which, for example, identify the audio signals as stereophonic, monaural or bilingual, and may further include dubbing protect ID signals which, upon reproduction, will inhibit duplication of the recorded audio signals. The index signals may still further include "chapter" or "phrase" codes depending on the recorded scene, as well as address codes indicating the record position on tape 2 and additional timing codes. The input index signals IDin are interleaved and encoded with the data words of the digital audio signal in order to form audio signal P, for example by using the method for cross interleaving and encoding disclosed in U.S. Pat. No. 4,562,587.

Thus, in the normal recording mode, the video signal V output from video processing system 17 to head change-over switch 20 and the digital audio signal P from PCM processing system 19 supplied through switch 33 to head change-over switch 20 are alternately supplied at predetermined times to adders 15A and 15B to be mixed with respective pilot ATF signals from pilot change-over circuit 22 to form recording signals Ain and Bin.

Figure 8:
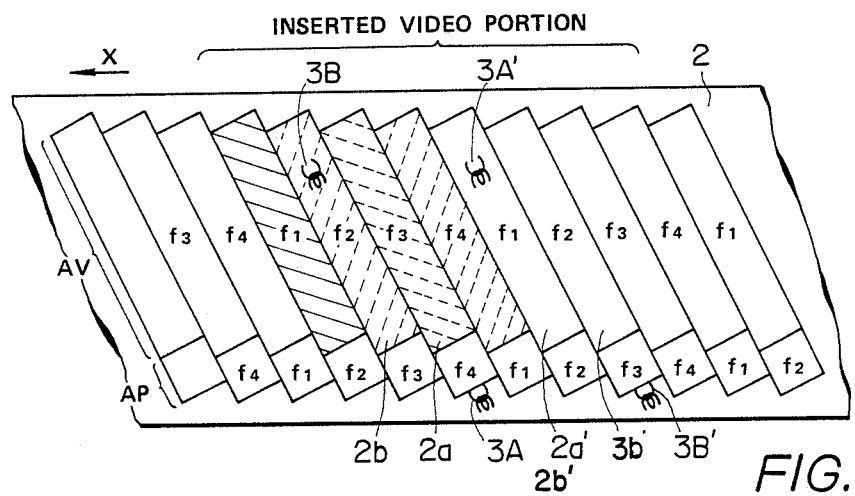
FIG. 8 is a schematic diagram showing the pattern of slant tracks in which signals are recorded by the VTR of FIG. 5 together with an indicated disposition of the rotary magnetic heads during an editing operation thereof.

As head change-over switch 20 switches the received video signals V and the digital audio signal P at one field periods, the pilot ATF signals are similarly switched at predetermined periods each corresponding to the combined duration of an overscan section and a main section of the tracks by pilot change-over circuit 22 and are supplied to adders 15A and 15B for superposition upon the received signals V and P to form the recording signals Ain and Bin. A typical recording pattern of pilot ATF signals is shown in FIG. 8. Upon reproduction, tracking servo control signals may be extracted by ATF control circuit 8 in response to the recorded pilot ATF signals for supply to capstan motor drive circuit 7.

In a normal reproducing mode of operation, the moveable contacts of switches 11A, 11B are switched by system controller 35 to contact playback contacts P therein, so that the signals reproduced by main rotary heads 3A and 3B are respectively supplied therethrough to reproducing amplifiers 13A and 13B. The reproduced signal Aout from reproducing amplifier 13A and the reproduced signal Bout from reproducing amplifier 13B are respectively supplied to first and second playback terminals P of a head change-over switch 23. Head change-over switch 23 has two interconnected output video terminals V which are respectively adapted to be selectively connected to the two playback terminals P for providing a single combined output video signal VPB. Head change-over switch 23 further includes two inter-connected audio output terminals A which are adapted to be selectively connected to playback terminals P for providing a single combined output audio signal. The moveable contacts of head change-over switch 23 are controlled by switching signal RF from system controller 35 in a manner analogous to the operation of head change-over switch 20 so as to provide the digital audio signals reproduced from the overscan sections of the tracks and contained in output signals Aout, Bout as a continued output signal and to provide the video signals reproduced from the main sections of the tracks and contained in output signals Aout, Bout as the continuous video output signal VPB. Thus, when head 3A is about to begin its scan of a track, for example track 2a in FIG. 6, head 3B is in the process of scanning the main section AV of track 2b. Therefore, the playback terminal P receiving Aout will contact its respective audio terminal A, while the playback terminal P receiving Bout will contact its respective video terminal. At the point when rotary head 3A finish its trace of the overscan section AP of track 2a and begins to reproduce the video signal $V_4$ in the main section AV thereof, main rotary head 3B has finished its scan of the main section AV in track 2b, and therefore the positions of the two moveable contracts are reversed to provide the video signal reproduced by main rotary head 3A and contained in signal Aout to the respective video terminal. When head 3B then reaches the beginning of the overscan section AP of the next following track, the audio signal recorded therein and reproduced by main rotary head 3B and contained in output signal Bout will be supplied from the respective playback terminal P to the audio output terminal A.

The played back video signal VPB alternately supplied from the two output video terminals V of head change-over switch 23 is supplied to video processing system 17, wherein it is processed into a conventional output video signal Vout and output through terminal 40. Similarly, the played back digital audio signal alternately supplied from the two audio output terminals A of switch 23 is supplied through a band pass filter 24 and supplied as signal PPB to PCM processing system 19, wherein it is de-interleaved, error corrected and transformed into output audio channel signals Lout and Rout and output through terminals 41L, 41R. The index signals ID interleaved with the audio signal are recovered and output as index signals IDout through terminal 420 to be used in other parts of the apparatus for mode control, timing, etc.

Output audio terminals A of head change-over switch 23 are also connected to a low pass filter 25 which extracts recorded pilot ATF signals $ATF_1$ and supplies them to a first input terminal of a switch 26. During this normal reproducing mode, the moveable contact of switch 26 contacts the input terminal receiving the pilot ATF signals $ATF_1$ and supplies them to ATF control circuit 8 for tracking servo control.

In addition to the above-described system for normal reproduction, the apparatus according to the present invention is operative in a dubbing or edit mode in which the original digital audio signals recorded in the overscan portions of the tracks may be reproduced by auxiliary rotary heads 3A', 3B', mixed with or replaced by new audio signals and re-recorded by main rotary heads 3A, 3B in the same tracks from which they were reproduced. Thus, during the edit mode auxiliary rotary heads 3A', 3B' successively trace alternate tracks and supply the signals reproduced thereby through reproducing amplifiers 14A, 14B as reproduced signals A'out, B'out to respective input terminals of a switch 27. Auxiliary heads 34A', 34B' are adapted to reproduce only while tracing the overscan portion AP of each track, and so the reproduced signals A'out, B'out containing only the digital audio data will not overlap. The moveable contact of switch 27 is controlled by system controller 35 to alternately connect the input terminals to an output terminal when the reproduced signals A'out, B'out are respectively presented thereat to provide a single combined signal and to supply the same to a second band pass filter 28, corresponding to first band pass filter 24, for producing a PCM signal P'out, while also supplying the combined signal to a second low pass filter 30, corresponding to first low pass filter 25, for providing the pilot ATF signals $ATF_2$ to switch 26 for tracking control during the edit mode.

The filtered PCM signal P'out from band pass filter 28 is supplied to a PCM decoder 29 which at least decodes or cross de-interleaves PCM signal P'out to produce left and right channel output decoded audio signals L'out and R'out. In the preferred embodiment, PCM decoder fully converts PCM signal P'out to decoded channel signals L'out, R'out in analog form, but in an alternative embodiment PCM decoder 29 simply decodes and cross de-interleaves PCM signal P'out to decoded channel signals in de-interleaved binary code form. The reproduced channel signals L'out, R'out are respectively supplied to signal mixers 31L, 31R. New or changed left and right decoded channel audio signals L'ch, R'ch are also supplied from terminals 32L, 32R to respective inputs of signal mixers 31L, 31R, respectively, so that they may be mixed therein with the reproduced channel signals L'out, R'out to form playback audio signals A'. It will be understood that when reproduced channel signals L'out, R'out are provided in analog form, new channel signals L'ch, R'ch are also provided in analog form and signal mixers 31L, 31R operate in an analog mode, while when reproduced channel signals L'out, R'out are provided in digital form, new channel signals L'ch, R'ch are also provided in digital form and signal mixers 31L, 31R operate in a digital mode. Signal mixers 31L, 31R are operative selectively combine reproduced channel signals L'out, R'out and new channel signals L'ch, R'ch to provide respective decoded composite audio signals A'. In particular, signal mixers 31L, 31R may superimpose new channel signals L'ch, R'ch on the corresponding reproduced channel signals L'out, R'out in predetermined proportions, or may completely replace reproduced channel signals L'out, R'out with new channel signals L'ch, R'ch, or may provide reproduced channel signals L'out, R'out unchanged as composite audio signals A' when the audio portion is to be left undisturbed, and the term "mixing" as used in this application will be understood to include all these processes. It will also be understood that new channel signals L'ch, R'ch need be supplied during a portion only of the interval corresponding to each block of audio data, so that that portion only of the audio data is represented by a mixed signal, while the remaining audio data will be formed only of the reproduced channel signals L'out and R'out. The decoded composite audio signals A' are supplied to a PCM encoder 32, which receives new index signals ID' from an input terminal 34 for combining with signals A' and subjects the combination at least to a second encoding and cross interleaving process to form a new encoded digital audio signal P' to be used for rerecording. Of course, if composite audio signals A' are in analog form, PCM encoder 32 will first convert these signals to pulse code modulated digital form. PCM decoder 29, signal mixers 31L, 31R and PCM encoder 32 may therefore be considered to constitute a new PCM processing system 19'. The new encoded digital audio signal P' from such system 19' is supplied to a second input terminal of switch 33 and, during the edit mode operation, the moveable contact of switch 33 is controlled by system controller 35 to engage this second input terminal, as illustrated in FIG. 5, so that the new encoded digital audio signal P' is supplied as the recordable digital audio signal, in place of original encoded digital audio signal A, to the audio input terminals A of change-over switch 20. From change-over switch 20, the new digital audio signal P' is supplied through adder 15A or 15B, recording amplifier 12A or 12B and switch 11A or 11B to main rotary head 3A or 3B.

As described above, auxiliary rotary head 3A' reproduces from the overscan portion of a track, e.g. track 2a', which is two tracks upstream, in respect to the transporting direction of tape 2, relative to the track 2a next to be scanned by main rotary head 3A. Similarly, auxiliary rotary head 3B' traces a track 2b' which is two tracks upstream, considered in respect to the tape transporting direction, relative to the track 2b next to be scanned by main rotary head 3B. When auxiliary rotary head 3A' traces track 2a' to reproduce the digital audio signal recorded in the overscan portion AP thereof, this reproduced signal is provided to PCM decoder 29 for a decoding process which requires one field interval for its completion. The decoded signals $L'_{out}$ and $R'_{out}$ are mixed with new audio signals and then supplied to PCM encoder 32 for an encoding process which also requires one field interval. The resulting new digital audio signal P' is supplied back through switches 33 and 20 and thence to main rotary head 3A after two video field intervals have elapsed from the time of its reproduction by auxiliary rotary head 3A'. However, in that two field interval, tape 2 has been driven by capstan 6 for a distance corresponding to two fields, that is, for two tracks, so that main rotary head 3A is disposed to trace the very track 2a' from which the signal it now receives was reproduced. Consequently, the audio data may be edited or rewritten as many times as desired without disturbing the correspondence between the blocks of audio data and the corresponding fields of video signals.

Figure 7:
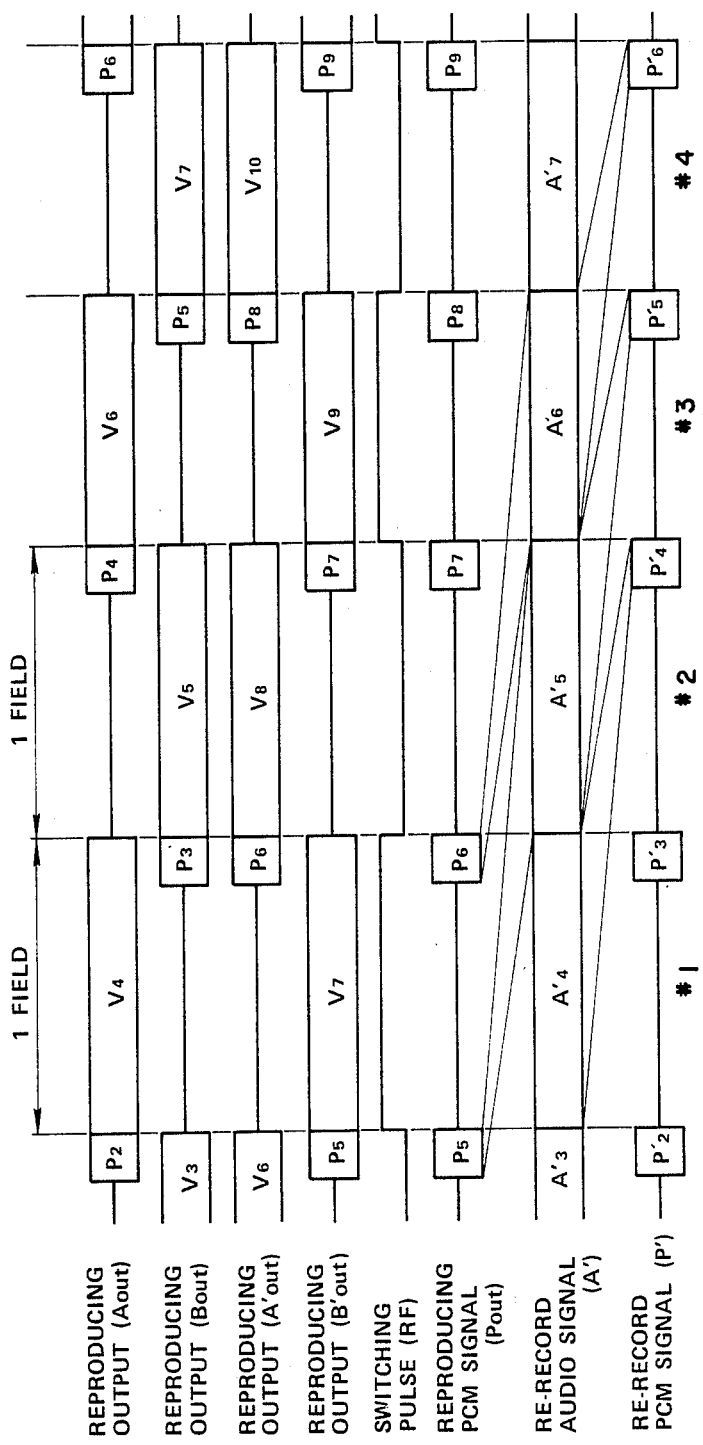
FIG. 7 is a timing chart illustrating a PCM signal dubbing operation performed by the VTR of FIG. 5.

As illustrated in FIG. 7, main rotary heads 3A and 3B reproduce the digital audio and video data in reproducing outputs Aout and Bout, respectively, with a fixed relationship therebetween. More specifically, main rotary heads 3A reproduces even numbered blocks of audio data immediately followed by even numbered fields of video data, as at $P_2, V_4$ and $P_4, V_6$ on FIG. 7, and main rotary head 3B reproduces odd numbered blocks of audio data immediately followed by odd fields of video data, as at $P_3, V_5$ and $P_5, V_7$. Although not illustrated, it is readily apparent that, during a recording operation, recording signals Ain and Bin follow the same pattern as reproducing outputs Aout and Bout, respectively. Auxiliary rotary heads 3A' and 3B' reproduce the audio blocks and video fields in the same fixed relationship, but because they reproduce from tracks which are upstream relative to the tracks next to be scanned by main rotary heads 3A and 3B, auxiliary rotary heads 3A' and 3B' reproduce the respective audio blocks earlier than main rotary heads 3A and 3B.

As a specific example, FIG. 7 indicates that auxiliary rotary head 3B' traces a track to reproduce audio block $P_5$ just prior to field interval #1 in which video field $V_7$ would appear if reproduced. The corresponding main rotary head 3B, on the other hand, would next scan a track to reproduce or record audio block $P_3$ just prior to field interval #2 of video field $V_5$ and will only reproduce (or record) audio block $P_5$ just prior to field interval #4, that is, two field intervals later. As further indicated in FIG. 7, when audio block $P_5$ appears in reproducing output B'out, it is presented in reproduced PCM signal P'out to PCM decoder 29 without significant delay. However, PCM decoder 29 presents the data of audio block $P_5$ as audio rerecord signal $A'_5$ to PCM encoder 32 only in field interval #2, that is, after a one field interval delay. Thereafter, PCM encoder 32 presents new audio block $P'_5$ in rerecord PCM signal P' only at the end of field interval #3 just before field interval #4, that is, after a further delay of one field interval. Just at this same time main rotary head 3B is tracing the overscan section from which audio block $P_5$ was earlier reproduced (see reproducing output Bout), and so main rotary head 3B records new audio block $P'_5$ in the overscan section just prior to the main section where video field $V_7$ is recorded, with the result that the correspondence between audio blocks and video fields is unchanged.

In the above-described preferred embodiment, the total elapsed time required for decoding and encoding is two field intervals and, therefore, the auxiliary rotary heads 3A' and 3B' are disposed to trace tracks two tracks upstream from those to be next traced by the main rotary heads 3A and 3B, respectively. However, it will be understood that the spacing between the tracks traced by the main and auxiliary rotary heads, respectively, may be altered when more or less processing time is required between reproduction and rerecording in the edit mode in order to maintain the above-described correspondence between the blocks of audio data and fields of video data.

In the case of insert editing, the video signals recorded in main sections AV of slant tracks 2a and 2b are also edited and are erased by main rotary heads 3A, 3B in the course of the process by which new video signals are written in these sections by main rotary heads 3A, 3B. During this insert editing mode, tracking control may be correctly maintained by using the pilot ATF signals $ATF_2$ separated by filter 30 from the played back output signals A'out and B'out obtained from auxiliary rotary heads 3A', 3B'. As illustrated in FIG. 8, pilot ATF signals having the appropriate frequencies in cyclical agreement with the original pilot frequencies are supplied for recording by the heads 3A, 3B having the appropriate azimuth angles.

Figure 9:
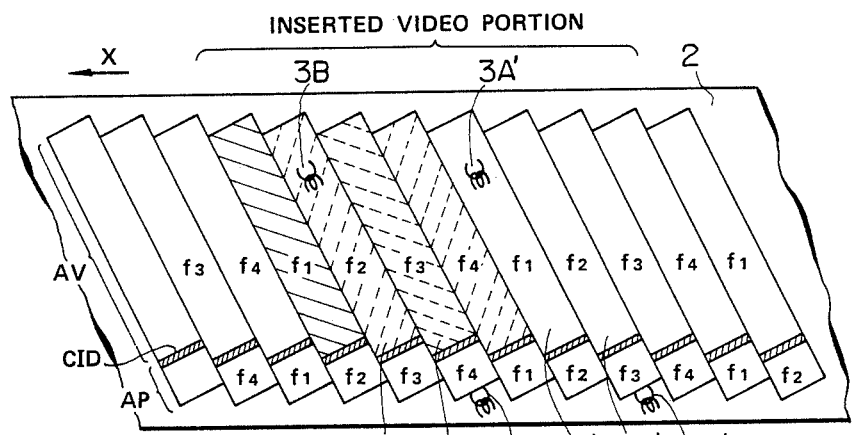
FIG. 9 is a schematic diagram showing the pattern of slant tracks in which signals are recorded by an 8 mm VTR to which a second preferred embodiment of the present invention is advantageously applied.

A second preferred embodiment of the present invention will now be described with reference to FIGS. 9 and 10, and is effected to recorded coded index signals CID in an index section of each track between the respective overscan section AP and main section AV. These coded index signals CID are obtained by the coding into digital form of index signals, such as mode control signals similar to those contained in index signals ID. In particular, coded index signals CID may indicate that reproduction is to be sterophonic, monaural or bilingual, or may indicate "dubbing protect," "chapter code" or "phrase code," as well as providing timing and address codes as in the first embodiment of the present inveniton. Coded index signals for use in video tape recorders are known from European Laid-Open publication No. 0209151, published Jan. 21, 1987 and assigned in common with the present application. In the embodiment of the invention shown in FIG. 10, elements corresponding to those described with reference to FIG. 5 are identified by the same reference numerals and operate in precisely the same way.

Figure 10:
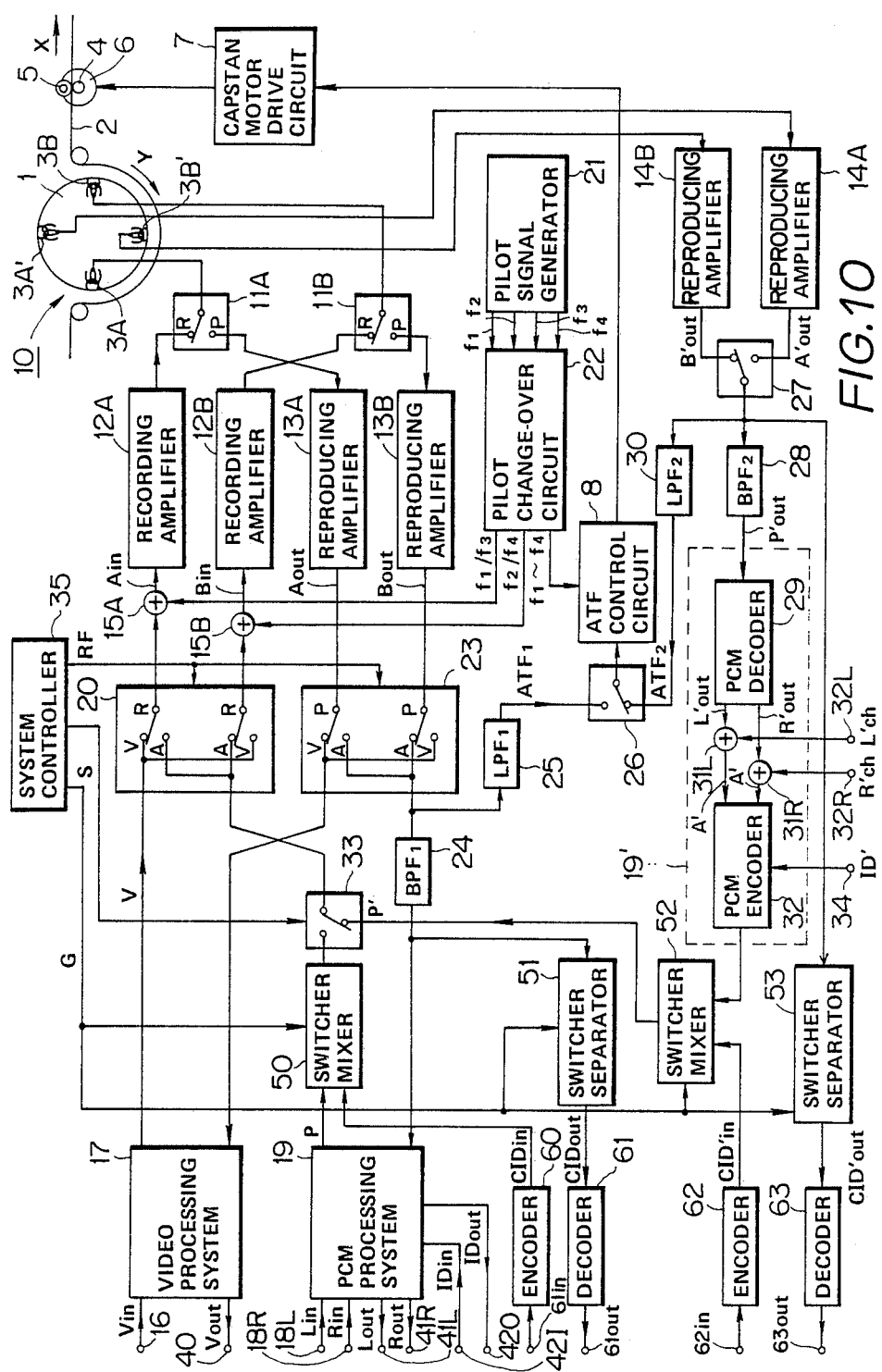
FIG. 10 is a block diagram of the second preferred embodiment of to which the present invention advantageously applied to an 8 mm VTR.

Further, as shown in FIG. 10, an encoder 60 receives index signals at input terminal 61in and outputs coded index signals CIDin in digital form to a switcher/mixer 50, which may be, for example, constituted by a multiplexer, and which also receives the original digital audio signal P from PCM processing system 19. Switcher/mixer 50 is controlled by a control signal G from system controller 35 to append the coded index signals CIDin at the end of each block of audio data constituting original digital audio signal P and supplies the combined signal to the first input terminal of switch 33. Switch 33 supplies the combined signal to head changeover switch 20 for subsequent recording by the main rotary heads 3A,3B, whereby a coded index signal CID is recorded following the overscan section AP and before the main section AV in each track, as shown in FIG. 9. In the normal reproducing mode, the combined signal consisting of the block of digital audio data followed by coded index signals CID is supplied from main rotary heads 3A, 3B ultimately through band pass filter 24, as in the embodiment of FIG. 1, and then both to PCM processing system 19, which separates out the digital audio signals and provides the output channel signals Lout, Rout, and to a switcher/separator 51, for example, in the form of a de-multiplexer which is controlled by signal G from system controller 35 so as to extract the coded index signals CID and output them as signals CIDout to a decoder 61. In decoder 61, the coded index signals CIDout are converted back to index signals and are supplied through output terminal 61out for use in controlling the reproducing mode of operation.

In the edit mode of operation, the index signals are supplied through input terminal 62in to encoder 62, which supplies new coded index signals CID'in to a switcher/mixer or multiplexer 52. The purpose of providing a second encoder 62 is in part to ensure that the absolute address information indicating the tape position or the index contents identifying the time code are automatically updated in the index signals supplied to input terminal 62in. Switcher/mixer 52 also receives the new digital audio signal P' from PCM encoder 32 of second audio processing system 19' and is operative throughout the edit mode to append the coded index signal CID'in to the end of the blocks of audio data, in precisely the same manner as switcher/mixer 50. The replacement by the new coded index signals CID'in occurs even when the audio data is unchanged, so that the proper mode control signals are available throughout the recorded program. Thus, switcher/mixer 52 provides the new audio digital signal P' including the new coded index signal CID'in to the second input terminal of switch 33 for rerecording in the edit mode.

The coded index signals CIDin are thereafter reproduced by auxiliary rotary heads 3A' and 3B' in output signals A'out and B'out and are supplied from the output terminal of switch 27 to a switcher/separator or demultiplexer 53, which is controlled by control signal G from system controller 35 to produce the output coded index signals CID'out. These signals CID'out are provided to a decoder 63, which decodes them to the original index signals and provides them at output terminal 63out.

Thus, in accordance with the present invention, apparatus for recording digital and audio signals is provided in which an editing operation may replace all or only a small portion of each block of audio data without disturbing the correspondence between the blocks of audio data and the corresponding fields of video data. In addition, the apparatus has a simplified construction and further permits the addition of coded index signals for recording in a separate index section on each track.

While the above description has been given with respect to preferred embodiments of the present invention as applied to an 8 mm VTR, the present invention may also be applied to a dubbing device adapted for duplicating the tape and using two magnetic recording and reproducing devices.

Although preferred embodiments of the present invention have been described in detail with reference to the drawings, it will be apparent that the invention is not limited to these precise embodiments, and that many modifications and variations could be effected therein by one skilled in the art without departing from the spirit or scope of the invention as defined by the appended claims.

What is claimed is:

1. Apparatus for recording video and audio signals in a plurality of successive tracks on a recording medium, comprising:

first audio signal processing means receiving an original audio signal for converting the same to an original encoded digital audio signal;

video signal processing means for providing a video signal;

means for transporting said record medium in a transporting direction;

at least first and second main rotary heads for recording signals supplied thereto in respective ones of said successive tracks on said recording medium;

first switch means for selectively supplying said video signal and a recordable digital audio signal to said main rotary heads;

control means for controlling said first switch means so that said video signal is supplied to said main rotary heads for recording in a main section of each of said tracks and said recordable digital audio signal is supplied to said main rotary heads for recording in an overscan section of each of said tracks;

at least first and second auxiliary rotary heads disposed for reproducing the digital audio signal recorded in respective tracks which are positioned upstream, considered in respect to said transporting direction, relative to tracks to be next scanned by said first and second main rotary heads, respectively;

second audio signal processing means for at least decoding the signals reproduced by said auxiliary rotary heads to a decoded reproduced audio signal;

audio signal inserting means having inputs for receiving a new decoded audio signal and said decoded reproduced audio signal and selectively combining the same to provide a decoded composite audio signal;

third audio signal processing means for encoding said composite audio signal to a new encoded digital audio signal; and second switch means operable by said control means for supplying a selected one of said new encoded digital audio signal and said original encoded digital audio signal to said first switch means for supplying by the latter as said recordable digital audio signal to said main rotary heads.

2. Apparatus according to claim 1, in which said auxiliary rotary heads are disposed for reproducing from tracks which are two tracks upstream from those to be next scanned by the corresponding main rotary heads.

3. Apparatus according to claim 1, in which said auxiliary rotary heads are disposed for reproducing from tracks which are upstream of the tracks to be next scanned by said corresponding main rotary heads by a distance corresponding to a two field interval of said video signal.

4. Apparatus according to claim 1, further comprising a source for supplying respective index signals to said first and third audio signal processing means for combination with the audio signals respectively received thereby.

5. Apparatus according to claim 4, wherein said index signals include mode control signals.

6. Apparatus according to claim 1, further comprising means for generating an original coded index signal;
third switch means operable by said control means for appending said original coded index signal to said original encoded digital audio signal for subsequent recording on said recording medium in an index section between said main section and said overscan section in each of said tracks;
means for generating a new coded index signal; and
fourth switch means operable by said control means for replacing said original coded index signal with said new coded index signal in all signals reproduced by said auxiliary rotary heads for subsequent recording in said index section.

7. Apparatus according to claim 6, wherein each of said original and new coded index signals includes mode control signals.

8. Apparatus according to claim 6, in which said original encoded digital audio signal is also replaced by said new encoded digital audio signal.

9. Apparatus according to claim 1, in which said original audio signal is in analog form and said first audio signal processing means converts the same to digital form.

10. Apparatus according to claim 9, in which said second audio processing means converts the signals reproduced by said auxiliary rotary heads to said decoded reproduced audio signal in analog form, said audio signal inserting means receives said new decoded audio signal in analog form and provides said decoded composite audio signal in analog form, and said third audio signal processing means converts said decoded composite audio signal to digital form.

11. Apparatus according to claim 1, in which said audio signal inserting means mixes said decoded reproduced audio signal and said new decoded audio signal in predetermined proportions to provide said decoded composite audio signal.

12. Apparatus according to claim 1, in which said audio signal inserting means replaces said decoded reproduced audio signal with said new decoded audio signal to provide said decoded composite audio signal.

13. Apparatus according to claim 1, in which said first audio signal processing means also interleaves data in said original encoded digital audio signal; said second audio processing means converts the signals reproduced by said auxiliary rotary heads to said decoded reproduced audio signal in de-interleaved digital form, said audio signal inserting means receives said new decoded audio signal in de-interleaved digital form and provides said decoded composite audio signal in de-interleaved digital form and said third audio signal processing means interleaves data in said new encoded digital audio signal similarly to said first audio signal processing means.

* * * * *